United States Patent
Hu et al.

(10) Patent No.: US 9,963,760 B2
(45) Date of Patent: May 8, 2018

(54) BACKFLOW CASCADE NOVEL PROCESS FOR PRODUCING LITHIUM-7 ISOTOPE

(71) Applicant: Shanghai Institute of Organic Chemistry, Chinese Academy of Sciences, Shanghai (CN)

(72) Inventors: Jinbo Hu, Shanghai (CN); Wei Zhang, Shanghai (CN); Weiqin Zheng, Shanghai (CN); Guanghua Chen, Shanghai (CN); Xiao Shi, Shanghai (CN); Yongchang Xu, Shanghai (CN); Honggui Lv, Shanghai (CN); Chengye Yuan, Shanghai (CN)

(73) Assignee: Shanghai Institute of Organic Chemistry, Chinese Academy of Sciences, Shanghai (CN)

( * ) Notice: Subject to any disclaimer, the term of this patent is extended or adjusted under 35 U.S.C. 154(b) by 89 days.

(21) Appl. No.: 14/899,370

(22) PCT Filed: Mar. 28, 2014

(86) PCT No.: PCT/CN2014/074304
§ 371 (c)(1),
(2) Date: Mar. 31, 2016

(87) PCT Pub. No.: WO2014/201890
PCT Pub. Date: Dec. 24, 2014

(65) Prior Publication Data
US 2016/0215363 A1  Jul. 28, 2016

(30) Foreign Application Priority Data

Jun. 17, 2013 (CN) .......................... 2013 1 0239535

(51) Int. Cl.
| | |
|---|---|
| C22B 26/00 | (2006.01) |
| C22B 26/12 | (2006.01) |
| B01D 59/24 | (2006.01) |
| C22B 3/22 | (2006.01) |
| C22B 3/44 | (2006.01) |
| C22B 3/26 | (2006.01) |

(52) U.S. Cl.
CPC .............. *C22B 26/12* (2013.01); *B01D 59/24* (2013.01); *C22B 3/0005* (2013.01); *C22B 3/22* (2013.01); *C22B 3/44* (2013.01); *Y02P 10/234* (2015.11)

(58) Field of Classification Search
CPC .......... C22B 3/22; C22B 26/12; C22B 3/0035
USPC .......................................................... 423/2
See application file for complete search history.

(56) References Cited

U.S. PATENT DOCUMENTS

| 4,600,566 A | * | 7/1986 | Fujine | .................... B01D 59/30 |
| | | | | 423/179.5 |
| 2015/0299822 A1 | * | 10/2015 | Li | .......................... B01D 59/24 |
| | | | | 423/179.5 |

FOREIGN PATENT DOCUMENTS

| CN | 102430338 |   | 5/2012 |
| CN | 102786616 |   | 11/2012 |
| CN | 102911372 |   | 2/2013 |
| JP | 53-024998 | * | 3/1978 |
| RU | 2216391 | * | 11/2003 |

OTHER PUBLICATIONS

Translation of Gu et al., "Lithium isotope separation", Progress in chemistry, Sep. 23, 2011(9), pp. 1892-1905.*
Chen et al., Studies on Separation Of Lithium Isotopes By Solvf.Nt Extraction I. The Separation Effects Of Lithium Isotopes By Sudan I-Neutral Ligand Synergetic Extraction Systems. Atomic Energy Science Technology. Jul. 1987;21(4):433-440.
Gu et al., Lithium Isotope Separation. Progress in Chemistry. Sep. 2011;23(9):1892-1905.
Xiao et al., Present status and future prospect of isotope separation(II). J Nuclear Radiochemistry. Feb. 1991;13(1):1-9.

* cited by examiner

*Primary Examiner* — Steven Bos
(74) *Attorney, Agent, or Firm* — Wolf, Greenfield & Sacks, P.C.

(57) ABSTRACT

Provided is a backflow cascade novel process for producing a lithium-7 isotope. The process comprises an upper backflow section, an extraction section, an enrichment section, a lower backflow section, and a product acquiring section. Upper backflow phase-conversion liquid and lower backflow phase-conversion liquid are respectively added to the upper backflow section and the lower backflow section, and upper backflow phase-conversion liquid and lower backflow phase-conversion liquid of the lithium material are controlled; the product is precisely acquired in the product acquiring section; an organic phase is added to the upper backflow section, and is recycled in the lower backflow section. By means of cascade connection with a high-performance liquid separator, environmental protection, high efficiency, and multi-level enrichment of the lithium-7 isotope are achieved, and a high-abundance lithium-7 isotope product is obtained.

18 Claims, 1 Drawing Sheet

United States Patent US 9,963,760 B2

BACKFLOW CASCADE NOVEL PROCESS FOR PRODUCING LITHIUM-7 ISOTOPE

RELATED APPLICATIONS

This application is a national stage filing under 35 U.S.C. § 371 of International Application PCT/CN2014/074304 entitled "BACKFLOW CASCADE NOVEL PROCESS FOR PRODUCING LITHIUM-7 ISOTOPE" filed Mar. 28, 2014, which claims priority to CN Application No. 201310239535.X, filed Jun. 17, 2013, the entire disclosure of each of which is incorporated by reference in its entirety.

FIELD OF THE INVENTION

The present invention relates to separation of isotopes in the chemical engineering field, and especially to a backflow cascade process for producing lithium-7 isotope.

BACKGROUND OF THE INVENTION

There are two natural isotopes of lithium (Li) in nature, i.e., $^7$Li and $^6$Li, which make up 92.48% and 7.52% respectively. The nuclear reaction properties of the two isotopes are quite different, although both two isotopes play important roles in nuclear material field. $^7$Li is an essential molten salt coolant in thorium molten salt reactors. Since the thermal neutron absorption cross section of $^6$Li is quite high, which is 941 barns, while that of $^7$Li is only 0.033 barns, the molten salt reactor requires that the abundance of $^7$Li is >99.995%. Meanwhile, $^7$Li of high purity is used to adjust the pH value of primary coolant in pressurized-water reactors and is also used as a heat-conducting agent in fusion reactors. $^6$Li is a fuel in nuclear fusion reactors, wherein the abundance of $^6$Li should be >30%. In thorium molten salt reactors or in fusion reactors, lithium isotopes are used as indispensable strategy materials and energy materials, and provide a solution for the development of new energy.

The lithium isotope separation methods reported in the literature comprise: physical methods (such as an electromagnetic method, molecular distillation method and gas diffusion method, etc.) and chemical methods (such as electro-migration, electrolysis, a lithium-amalgam exchange method and solvent extracting exchange method, etc.) (Xiaoan Xiao et al, *Journal of Nuclear and Radiochemistry*, 1991, 13, 1). In the isotope separation field, physical methods are advantageous for heavy isotopes; while for light isotopes, the chemical methods are of higher efficiency and the physical methods are of low efficiency and great investment.

Since the lithium isotopes are light isotopes, and there is no lithium gaseous state, the lithium isotope separation by physical methods is only in the exploratory stage. With respect to chemical methods, most research in the field only involves determination and improvement of single stage isotope separation factor in the laboratory instead of multiple-stage separation. Meanwhile, in the chemical methods, gas-liquid chemical exchange method is not applicable for lithium, while the solid-liquid chemical exchange method is difficult to achieve a countercurrent multi-stage cascade. Therefore, only a liquid-liquid chemical exchange method can be adopted. When using the solid-liquid chemical exchange method, the crown ether polymers described in applications e.g., CN201210274233.1 and CN201210274356.5, possess a relatively high separation factor, but it is difficult to achieve a countercurrent multi-stage cascade with the solid-liquid chemical exchange method. When the liquid-liquid chemical exchange method is used, the single stage isotope separation factor α of the Sudan I-TOPO system is usually about 1.010 (Chen et al., Atomic Energy Science and Technology, 1987, 21, 433). However, a countercurrent multi-stage cascade has not been reported.

In order to be a practical lithium isotope separation method, it requires not only a large single stage isotope separation factor α of the separation system, but also a multi-stage cascade to be achieved in the chemical process. Thus a special cascade process, in which there is a strict method of controlling reflux, is required. The reflux must be thorough, easy to use and of low energy consumption. A precise feeding and reclaiming process must be achieved. The flow rate and flowing situation in the isotope enriching segment should be calculated and controlled so that a multi-stage cascade form is used to cumulatively enrich lithium-7 isotope products in high abundance.

So far, the multi-stage cascade enrichment process has not been reported in any of the above-mentioned physical or chemical methods. Only the lithium amalgam chemical exchange method has relatively good chemical properties and chemical technology, and has become the only industrial method for producing lithium-7 isotope (Chemical isotope separation principle, edited by Qiu Ling, Atomic Energy Press, 1990, pp 156-181). However, this process requires a lot of mercury which easily becomes volatile and runs off, is harmful to the operators' health and causes serious environmental pollution. Moreover, in this process, the sodium amalgam phase easily enriches $^6$Li. As lithium amalgam in the extraction column gradually decomposes, the method is difficult to meet the $^7$Li abundance requirement for thorium-based molten reactors, which is greater than 99.995%. Based on the characteristics and phase inversion requirements of lithium enrichment and separation, it is beneficial to choose organic phases which easily extract lithium and enrich for $^7$Li.

DETAILS OF THE INVENTION

The object of the present invention is to provide a novel process for producing lithium-7 isotope.

The first aspect of the present invention provides a method for producing lithium-7 isotope, wherein the method comprises the following steps:

(1) continuously and countercurrently running aqueous phase and organic phase;

wherein the organic phase sequentially passes through an upper backflow section, an extraction section, an enrichment section, and a lower backflow section circularly, wherein a part of the organic phase flows through the enrichment section into a product acquiring section; and the aqueous phase sequentially flows through the lower backflow section, the enrichment section, the extraction section and the upper backflow section, and then flows out;

(2) adding lower backflow phase-conversion liquid into the lower backflow section;

adding upper backflow phase-conversion liquid into the upper backflow section; and adding reverse extraction liquid into the product acquiring section;

(3) adding feed liquid comprising lithium-7 into the enrichment section, the feed liquid is extracted by the extraction section and the upper backflow section, and enriched in the enrichment section, then the organic phase is separated into two parts:

(a) one part flows into the product acquiring section for reverse extraction, thus obtaining a product;
(b) the other part flows into the lower backflow section.

In another preferred embodiment, continuously countercurrent running means that the aqueous phase flows in a direction opposite to the organic phase.

In another preferred embodiment, the method further comprises a step of discharging waste from the extraction section.

In another preferred embodiment, upper backflow phase-conversion liquid is added into the upper backflow section to adjust the pH value of the backflow organic phase.

In another preferred embodiment, in step (3), the organic phase extracts the aqueous phase comprising lithium-7 in the enrichment section, the extraction section, and the upper backflow section; and/or the lower backflow phase-conversion liquid extracts the organic phase in the lower backflow section; and/or the reverse extraction liquid reversely extracts the organic phase in the product acquiring section so as to obtain the product.

In another preferred embodiment, the method further comprises the following step: after reversely extracting the organic phase in the lower backflow section with lower backflow phase-conversion liquid, the aqueous phase backflows into the enrichment section for circular extraction.

In another preferred embodiment, before the enrichment section, the aqueous phase flowing out from the lower backflow section is concentrated.

In another preferred embodiment, the aqueous phase flowed out from the lower backflow section is concentrated in an inspissator.

In another preferred embodiment, the method comprises the following step: the organic phase flows out from the product acquiring section into the upper backflow section.

In another preferred embodiment, the organic phase comprises an extractively effective amount of a compound of formula (I):

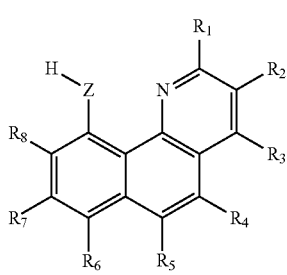

(I)

wherein in formula (I),

Z is oxygen atom, sulfur atom, or nitrogen atom substituted by $R_9$, wherein $R_9$ is hydrogen, $C_{1-6}$ alkyl-sulfonyl, $C_{1-6}$ haloalkyl-sulfonyl, benzenesulfonyl or $C_{1-6}$ alkyl-benzenesulfonyl; $R_1$, $R_2$, $R_3$, $R_4$, $R_5$, $R_6$, $R_7$ and $R_8$ are independently selected from the group consisting of: hydrogen, $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, halogen and phenyl.

In another preferred embodiment, the $R_9$ is hydrogen, trifluoromethylsulfonyl, methylsulfonyl, or p-toluenesulfonyl group.

In another preferred embodiment, $R_1$ is hydrogen, $C_{1-6}$ alkyl, $C_{1-6}$ haloalkyl, or phenyl.

In another preferred embodiment, the organic phase further comprises a synergic extractant.

In another preferred embodiment, the synergic extractant comprises a phosphorus-containing compound, nitrogen-containing compound, alkyl quaternary sulfonium salt compound or sulfoxide compound.

In another preferred embodiment, the synergic extractant is a neutral phosphorus-containing compound, quaternary ammonium salt compound, long-chain alkyl quaternary sulfonium salt compound or neutral sulfoxide compound.

In another preferred embodiment, the synergic extractant comprises: tributyl phosphate (TBP), trioctyl-phosphine oxide (TOPO), dibutyl butanephosphonate (DBBP), butyl dibutylphosphate (BDBP), methylene tetrabutyldiphosphate, trioctyl ammonium oxide, 1,10-phenanthroline, quaternary ammonium salt N263, dimethyl bis (N-octadecyl) ammonium chloride, methyldioctylsulfonium chloride or dioctyl sulfoxide.

In another preferred embodiment, the organic phase further comprises a diluent.

In another preferred embodiment, the diluent comprises kerosene, octanone, chloroform, carbon tetrachloride, toluene, dimethylbenzene, diethylbenzene, bromobenzene, anisole, nitromethane, 2-methyl cyclohexanone, methyl isobutyl ketone, chlorobenzene, dichlorobenzene, trichlorobenzene, diphenyl ether, or the combinations thereof.

In another preferred embodiment, the organic phase further comprises lithium ions.

In another preferred embodiment, the content of lithium ions in the organic phase is 0-2.0 mol/L; and preferably 0.01-0.5 mol/L.

In another preferred embodiment, the method further comprises one or more features selected from the group consisting of:

the upper backflow phase-conversion liquid is an aqueous solution containing a solute selected from the group consisting of: sodium hydroxide, potassium hydroxide, cesium hydroxide, ammonium hydroxide, and combinations thereof;

the lower backflow phase-conversion liquid is an aqueous solution containing a solute selected from the group consisting of: HCl, $H_2SO_4$, HBr, NaCl, $NH_4Cl$, NaBr, $(NH_4)_2SO_4$, $Na_2SO_4$, $NaNO_3$, $NH_4NO_3$, KCl, $K_2SO_4$, and combinations thereof;

the reverse extraction liquid is an aqueous solution containing a solute selected from the group consisting of: HCl, $H_2SO_4$, HBr, NaCl, $NH_4Cl$, $(NH_4)_2SO_4$, $Na_2SO_4$, and combinations thereof.

In another preferred embodiment, in the upper backflow phase-conversion liquid, the concentration of the solute is 1-15 mol/L.

In another preferred embodiment, in the lower backflow phase-conversion liquid, the concentration of the solute is 0.1-5 mol/L.

In another preferred embodiment, in the reverse extraction liquid, the concentration of the solute is 0.1-5 mol/L.

In another preferred embodiment, the upper backflow section, the extraction section, the enrichment section, the lower backflow section and the product acquiring section are respectively comprised of a couple of cascade connected liquid-liquid separation equipments. Preferably, these liquid-liquid separation equipments are centrifugal extractors.

In another preferred embodiment, the upper backflow section is constituted by X cascade connected centrifugal extractors, wherein 2≤X≤20.

In another preferred embodiment, the extraction section is constituted by N cascade connected centrifugal extractors, wherein 10≤N≤500.

In another preferred embodiment, the enrichment section is constituted by M cascade connected centrifugal extractors, wherein 10≤M≤500.

In another preferred embodiment, the lower backflow section is constituted by Y cascade connected centrifugal extractors, wherein 2≤Y≤20.

In another preferred embodiment, the upper product acquiring section is constituted by Z cascade connected centrifugal extractors, wherein 2≤Z≤20.

In another preferred embodiment, the concentration of Li-7 in the aqueous phase at the exit of the upper backflow section and the concentration of Li-7 in the organic phase at the exit of the lower backflow section are less than $10^{-2}$ mol/L, and preferably less than $5 \times 10^{-3}$ mol/L; and/or the ratio between Li-7 molar flow N1 at the exit of the product acquiring section and Li-7 molar flow N2 at the exit of the enrichment section is N1:N2=0.001 to 0.025 preferably 0.001 to 0.02 and/or the method further comprises: controlling liquid flowing in a wave range of ≤0.005.

In another preferred embodiment, when it is calculated based on a flow rate of 17 L/min, the wave range w is 16.915 L/min≤w≤17.085 L/min.

The second aspect of the present invention provides a Li-7 enriched product produced by any method of the first aspect of the present invention, wherein the abundance Σ of Li-7 is ≥94%, preferably ≥96%, more preferably ≥98%, and most preferably ≥99%.

In another preferred embodiment, the Li-7 abundance Σ in the product is ≥99.99%.

In another preferred embodiment, the product can be used to prepare a molten salt coolant or molten salt reactor.

It should be understood that, in the present invention, each of the technical features specifically described above and below (such as those in the Examples) can be combined with each other, thereby constituting new or preferred technical solutions which need not be specified again herein.

EMBODIMENTS FOR CARRYING OUT THE INVENTION

Figure 1:
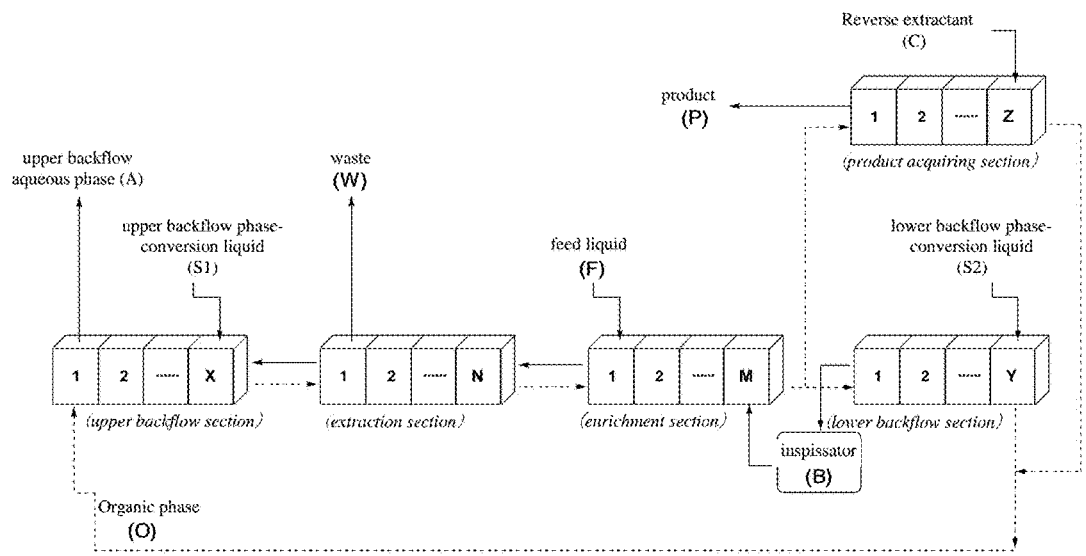
FIG. 1 shows a design diagram of the backflow cascade process of the present invention.

Through long-term and intensive research aiming to overcome deficiencies of the amalgam method in the field, the inventors have developed a method to easily produce Li-7 products in high abundance. The method is environmental friendly and free of pollution; the organic phase can easily enrich Li-7 isotope and can be recycled for further use. The upper and lower backflows and phase inversions are easy and efficient; the product acquiring section can achieve precise acquisitions, and the multiple stage cascade can obtain Li-7 isotope product in high abundance.

Terms

As used herein, the term "$C_{1-6}$ alkyl" refers to a linear or branched alkyl having 1 to 6 carbon atoms, such as methyl, ethyl, propyl, isopropyl, butyl, isobutyl, sec-butyl, tert-butyl, or the like The term "$C_{3-6}$ cycle alkyl" refers to a cyclic alkyl having 3 to 6 carbon atoms, such as cyclopropyl, cyclobutyl, cyclopentyl, cycloheptyl, or the like.

The term "$C_{2-6}$ alkenyl" refers to alkenyls having 2 to 6 carbon atoms, such as vinyl, propenyl, isopropenyl, butenyl, isobutenyl, sec-butenyl, tertiary butenyl, or the like The term "$C_{2-6}$ alkynyl" refers to alkynyls having 2 to 6 carbon atoms, such as ethynyl, propynyl, iso-alkynyl group, butynyl, iso-alkynyl group, sec-butynyl, tert-butynyl, or the like.

The term "$C_{1-6}$ alkoxy" refers to a linear or branched alkoxy having 1 to 6 carbon atoms, such as methoxy, ethoxy, propoxy, isopropoxy, butoxy, isobutoxy, sec-butoxy, tert-butoxy, or the like.

The term "halogenated" means that one or more hydrogen atom (s) of the group is substituted by a halogen atom.

The term "halogen" refers to F, Cl, Br and I.

Single Stage Separation Factor

As used herein, the terms "single stage separation factor" and "separation factor" can be used interchangeably, and both refer to the rate between the relative content before and after separation of two substances in a single unit (single-stage separation operation).

Lithium isotopes are separated by chemical exchange. The isotopes exchange reaction is expressed as follows:

$$^7LiA + {}^6LiB \rightleftharpoons {}^7LiB + {}^6LiA$$

wherein A and B represent different coordination environment of lithium ion in two phases, such as organic phase and aqueous phase.

The separation coefficient of isotopes (α value) represents the single stage separation effect of lithium isotopes, that is to say, the quotient of the specific value of lithium isotopes in B phase divided by the specific value of lithium isotopes in A phase:

$$\alpha = \frac{[^7LiB]/[^6LiB]}{[^7LiA]/[^6LiA]}$$

The separation coefficient represents the separation degree of two substances after-a certain unit separation operation or a certain separation process, and the value of which reflects how difficult it is to separate two substances. When the separation coefficient is 1, the separation cannot be achieved; the more the separation coefficient deviates from 1, the easier the separation.

A preferred lithium isotope separation system should have a high separation coefficient of isotopes α value in the process of chemical exchange; meanwhile, the isotope exchange reaction is quick when two phases contact. Reverse extraction can easily be achieved, thus achieving a multi-stage enriching extraction and the chemical structure of the extractant is stable and economically practical.

Organic Phase (O)

In the backflow cascade process of the present invention for enriching Lithium isotopic, the preferred organic phase comprises a compound of formula (I):

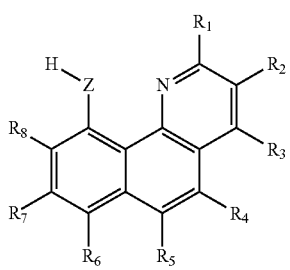

(I)

wherein, Z is oxygen atom, sulfur atom, or nitrogen atom substituted by $R_9$, wherein $R_9$ is selected form the following group: hydrogen, $C_{1-6}$ alkyl-sulfonyl, $C_{1-6}$ haloalkyl-sulfonyl, benzenesulfonyl or $C_{1-6}$ alkyl-benzenesulfonyl; $R_1$, $R_2$, $R_3$, $R_4$, $R_5$, $R_6$, $R_7$ and $R_8$ are independently selected from the group consisting of: hydrogen, $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, halogen and phenyl.

In another preferred embodiment, $R_9$ is hydrogen, trifluoromethanesulfonyl, methylsulfonyl or p-toluenesulfonyl.

In another preferred embodiment, $R_1$ is hydrogen, $C_{1-6}$ alkyl, $C_{1-6}$ haloalkyl or phenyl.

In another preferred embodiment, the organic phase further comprises a synergic extractant.

In another preferred embodiment, the synergic extractant is a phosphorus-containing compound, nitrogen-containing compound, alkyl quaternary sulfonium salt compound or sulfoxide compound.

In another preferred embodiment, the synergic extractant is a neutral phosphorus-containing compound, quaternary ammonium salt compound, long-chain alkyl quaternary sulfonium salt compound or neutral sulfoxide compound.

In another preferred embodiment, the synergic extractant comprises: tributyl phosphate (TBP), trioctyl-phosphine oxide (TOPO), dibutyl butanephosphonate (DBBP), butyl dibutylphosphate (BDBP), methylene tetrabutyldiphosphate, trioctyl ammonium oxide, 1,10-phenanthroline, quaternary ammonium salt N263, dimethyl bis (N-octadecyl) ammonium chloride, methyldioctylsulfoniumate chloride, dioctyl sulfoxide, or combinations thereof.

In another preferred embodiment, the diluent comprises: kerosene, octanone, chloroform, carbon tetrachloride, toluene, dimethylbenzene, diethylbenzene, bromobenzene, anisole, nitromethane, 2-methyl cyclohexanone, methyl isobutyl ketone, chlorobenzene, dichlorobenzene, trichlorobenzene, diphenyl ether, or combinations thereof.

In another preferred embodiment, the extraction organic phase further comprises lithium ion.

In another preferred embodiment, the concentration of lithium ion in the extraction organic phase is 0-2.0 mol/L, and preferably 0.01-0.5 mol/L.

The extraction agent in the organic phase plays a role in the extraction of a lithium ion. Further, the organic complex forms a chemical environment different from that of lithium-ion in the aqueous phase, resulting in a relatively large single stage separation factor. The single-stage separation factor of the organic phase extraction agents used in the present invention is generally 1.012 to 1.028. Different from amalgam method, the organic phase extraction agent of the present invention can easily enrich for lithium-7 isotope. During the multi-stage tandem (or cascade) process, the organic phase extraction agent has good chemical stability, and does not decompose over a long period. Therefore, the novel process of the present invention is more advantageous than the amalgam method in the production of a lithium-7 product having an abundance of 99.99% or more.

Reverse Extraction Liquid (C)

In the present invention, the organic phase is reversely extracted by reverse extraction liquid to obtain the product.

During the separation of isotopes, the product taking amount (P) has a great influence on the entire enrichment process. The product taking amount (P) must be smaller than the maximum quantity taken in the entire process, and should be stable and of small fluctuation to ensure stable multi-level isotope enrichment (Chen Guanghua, *precious metals*, 1982, 1,9).

In the present process, by precisely controlling the lithium-7 molar flow rate in the organic phase at the exit of the product acquiring section and the amount of reverse extraction liquid used, it is ensured that the Li-7 molar flow rate of the lithium enriched product (P) is 0.1 to 2.5% of that of the organic phase at the exit of the enrichment section. Ultimately, a lithium-7 product of high abundance is obtained.

The reverse extraction liquid suitable for use comprises an aqueous solution that has a solute selected from the following group: HCl, $H_2SO_4$, HBr, NaCl, $NH_4Cl$, $(NH_4)_2SO_4$, $Na_2SO_4$, or combinations thereof.

Backflow Phase-Conversion Liquid (S)

In the present invention, preferably, the backflow phase-conversion liquid is added into the system to utilize the extract organic phase in cycle.

The backflow phase-conversion liquid used in the present invention preferably includes upper backflow phase-conversion liquid (S1) and lower backflow phase-conversion liquid (S2), wherein the upper backflow phase-conversion liquid is added in the upper backflow section to efficiently and thoroughly extract and phase-convert the lithium materials in the aqueous phase at the exit of the product acquiring section. The lithium materials are transferred from the aqueous phase into the organic phase by the contacting organic phase and the upper backflow phase-conversion liquid, while the lithium material is discharged from system at the first level of the upper backflow section. Preferably, the lithium concentration in the aqueous phase discharged from the the upper backflow section is <0.01 mol/L, and preferably <$5 \times 10^{-3}$ mol/L.

The lower backflow phase-conversion liquid is added into the lower backflow section to reversely extract the organic phase in the enrichment section to efficiently and thoroughly recycle the lithium materials in the organic phase at the exit of the enrichment section. The reversely extracted organic phase backflows into the upper backflow section for circular extraction, an aqueous phase containing Li-7 material forms after the reverse extraction of the lower backflow phase-conversion liquid, and re-enters into the enrichment section for circular extraction. Preferably, the lithium concentration in the organic phase which has been reversely extracted and backflowed in the lower backflow section is <0.01 mol/L, and preferably <5×mol/L.

In the present invention, preferably, the upper backflow phase-conversion liquid (S1) comprises an alkaline solute. The alkaline solute is an alkali hydroxide, preferably sodium hydroxide, potassium hydroxide, cesium hydroxide, ammonium hydroxide, and combinations thereof.

In the preferred embodiments of the present invention, the concentration range of the alkaline solute is 1-15 mol/L.

In the present invention, preferably, the lower backflow phase-conversion liquid is an aqueous solution containing a solute selected from the following group: HCl, $H_2SO_4$, HBr, NaCl, NH$_4$Cl, NaBr, (NH$_4$)$_2$SO$_4$, Na$_2$SO$_4$, NaNO$_3$, NH$_4$NO$_3$, KCl, K$_2$SO$_4$, or combinations thereof.

High-Purity Lithium-7 Production Technology

The backflow cascade process mainly comprises the following sections: an upper backflow section, an extraction section, an enrichment section, a lower backflow section, and a product acquiring section.

Since the single-stage separation factor of chemical systems is small during the isotopic enrichment process, multistage cumulative enrichment of lithium isotopes can be achieved based on the single stage separation factor of the system and by connecting and controlling the multi-stage extraction equipment using the backflow cascade process of the present invention. Since the separation equipment needs multiple stages and high reliability, the selection of separation equipment is quite important. For incompatible organic phase and aqueous phase, the use of liquid-liquid separation equipment of high efficiency can greatly shorten the equilibrium time, reduce the amount of extractant used and reduce the volume of the extraction equipment. The highly efficient liquid-liquid separation equipment used in the present invention is preferably a centrifugal extractor.

In another preferred embodiment in the present invention, the upper backflow section, the extraction section, the enrichment section, the lower backflow section and the product acquiring section are constituted by a couple of cascade connected liquid-liquid separation equipments, wherein, the upper backflow section can be constituted by X cascade connected centrifugal extractors, wherein $2 \leq X \leq 20$;

the extraction section can be constituted by N cascade connected centrifugal extractors, wherein $10 \leq N \leq 500$;

the enrichment section can be constituted by M cascade connected centrifugal extractors, wherein $10 \leq M \leq 500$;

the lower backflow section can be constituted by Y cascade connected centrifugal extractors, wherein $2 \leq Y \leq 20$;

the product acquiring section can be constituted by Z cascade connected centrifugal extractors, wherein $2 \leq Z \leq 20$.

In order to obtain an isotope product of high abundance, the separation system must be multi-stage and cascaded. Such a separation system requires realization of a strict method of controlling upper and lower back flow backflow, and the backflow should be thorough, easy to use, and of low energy consumption.

As shown in FIG. 1, in the present invention, the upper backflow section is used for upper backflow phase-conversion of lithium materials. The organic extractant (O) is added into the front of the upper backflow section and preferably into the first stage of the upper backflow section, and the upper backflow phase-conversion liquid (S1) is added into the back of upper backflow section, and preferably into the Xth stage of the upper backflow section to achieve highly efficient and thorough extraction and phase inversion of the lithium material in the aqueous phase at the exit of the extracting section. The lithium enters into the extracting section after it is transferred from the aqueous phase into the organic phase. Preferably, after the extraction and phase inversion of upper back flow section, the phase inversion is deemed complete when the lithium concentration of the upper backflow aqueous phase (A) at the exit is within less than $5 \times 10^{-3}$ mol/L.

The extraction section and the enrichment section are mainly used for extraction and enrichment of lithium isotopes. The feed liquid (F) is added at the front of the enrichment section, and preferably at the first stage of the enrichment section, and then it enters into the aqueous phase of the extraction section. The Li-7 depleted waste (W) is obtained after being extracted for several times, in which the Li-7 isotope abundance is less than that in the feed liquid. The organic phase is divided into two parts at the exit of the enrichment section and preferably at the rear-end of the Mth stage of the enrichment section. One part enters into the product acquiring section, and the other part enters into the lower backflow section. A concentrator is installed in front of the aqueous phase in the lower backflow section to conduct necessary concentration of the aqueous phase discharged from the lower backflow section, and then the aqueous phase enters into the enrichment section.

The lower backflow section is used for lower backflow phase-conversion of lithium materials. Adding the lower backflow phase-conversion liquid (S2) into the rear part of the lower backflow section, and preferably into the Yth stage of the lower backflow section conducts reverse extraction and phase inversion of the organic phase in the enrichment section. High efficiency and thorough phase inversion and backflow of lithium materials in the organic phase at the exit of enrichment section are achieved. The lithium materials enter into the enrichment section after being transferred into the aqueous phase from the organic phase.

Preferably, the phase inversion is completed when the lithium concentration of the lower backflow organic phase (O) at the exit is controlled to less than $5 \times 10^{-3}$ mol/L after the extraction and phase inversion in the lower backflow section.

Another important problem during enrichment of isotopes with multi-stage extraction equipment is that the fluctuation of flow rate for two phases should be small. Otherwise, the stage efficiency of the enrichment section and the depletion section is greatly decreased, and the product may not be obtained after multi-stage enrichment. In the present method, the multi-stage enrichment of isotopes is ensured by using the product acquiring section, feeding system and flow stabilization system to control the fluctuation range of the liquid flow rate within 0.5%. The stage efficiency of the enrichment section is high and is more than 90%.

Through several times of repeated experimental verification and continuous optimization, the backflow cascade process of the present invention controls the lithium material concentration at exit of the upper and lower backflow section. Meanwhile, by using an effective product acquiring section, feeding system and flow stabilization system, the flow fluctuations during the cascade process are accurately measured and controlled. Ultimately, a multi-stage enrichment of lithium isotopes is achieved. For example, in an embodiment of the present invention, 98.55% of Li-7 isotope-enriched product is obtained.

The Main Advantages of the Present Invention are:

(1) By using the upper and lower backflow sections, highly efficient and thorough phase inversion of lithium materials in organic and aqueous phase at the exit is achieved. The run off of the lithium materials is controlled, thus ensuring multi-stage accumulation and enrichment of isotopes and obtaining a Li-7 isotope product of high abundance.

(2) The process of the present invention is well-designed and easy to operate. By using an effective product acquiring section and flow stability system, the quantity of materials and fluctuation of flow rate of the entire backflow technology are controlled, and the isotope enrichment process has high efficiency.

(3) When compared to the amalgam method, the method of the present invention has reduced the risks of mercury and is environmental friendly. The method of the present invention is also superior in producing products in which the Li-7 abundance is more than 99.99%.

(4) The organic phase can be recycled, and the aqueous phase of the upper backflow section can be re-concentrated to recycle the alkaline liquid, thus significantly reducing the cost of lithium isotope enrichment and having considerable economic benefits.

(5) By using the highly efficient centrifugal extractors and flow stabilization system, the balancing time, the extraction solvent quantity used and the equipment size are greatly reduced, thus saving manpower and costs.

The present invention will be further illustrated below with reference to specific examples. It should be understood that these examples are only to illustrate the invention but are not to limit the scope of the invention. The experimental methods with no specific conditions described in the following examples are generally performed under the conventional conditions, or according to the manufacture's instructions. Unless indicated otherwise, parts and percentage are calculated by weight.

Example 1

The lines were connected according to the design diagram of the backflow cascade process figure, wherein the stage number of every section was as follows: 10 stages in the upper backflow section, 37 stages in the extraction section, 63 stages in the enrichment section, 10 stages in the lower backflow section and 5 stages in the product acquiring section.

The organic phase comprised 7-trifluoromethyl-10-hydroxy benzoquinoline (the concentration was 0.38 mol/L), synergistic extractant and diluents. The nuclear magnetism of 7-trifluoromethyl-10-hydroxy benzoquinoline: 1H NMR: δ 8.91 (d, J=4.2 Hz, 1H), 8.37 (d, J=8.7 Hz, 1H), 8.21 (d, J=9.3 Hz, 1H), 8.00 (d, J=8.7 Hz, 1H), 7.83 (d, J=9.3 Hz, 1H), 7.68 (dd, J=8.4 Hz, J=4.8 Hz, 1H), 7.24 (d, J=8.7 Hz, 1H). $^{19}$F NMR: $\delta^-$58.0 (s, 3F).

Upper backflow phase-conversion liquid (S1): sodium hydroxide aqueous solution having a concentration of 4 mol/L.

Lower backflow phase-conversion liquid (S2): NaCl aqueous solution having a concentration of 3 mol/L.

The liquid-liquid separation equipment-high-speed centrifugal extractor.

The aqueous phase and the organic phase were continuously run, and the lithium concentration in the aqueous phase at the exit of the upper backflow section was measured to be $4*10^{-4}$ mol/L, while the lithium concentration in the organic phase at exit of the lower backflow section was measured to be $2*10^{-4}$ mol/L.

Figure 2:
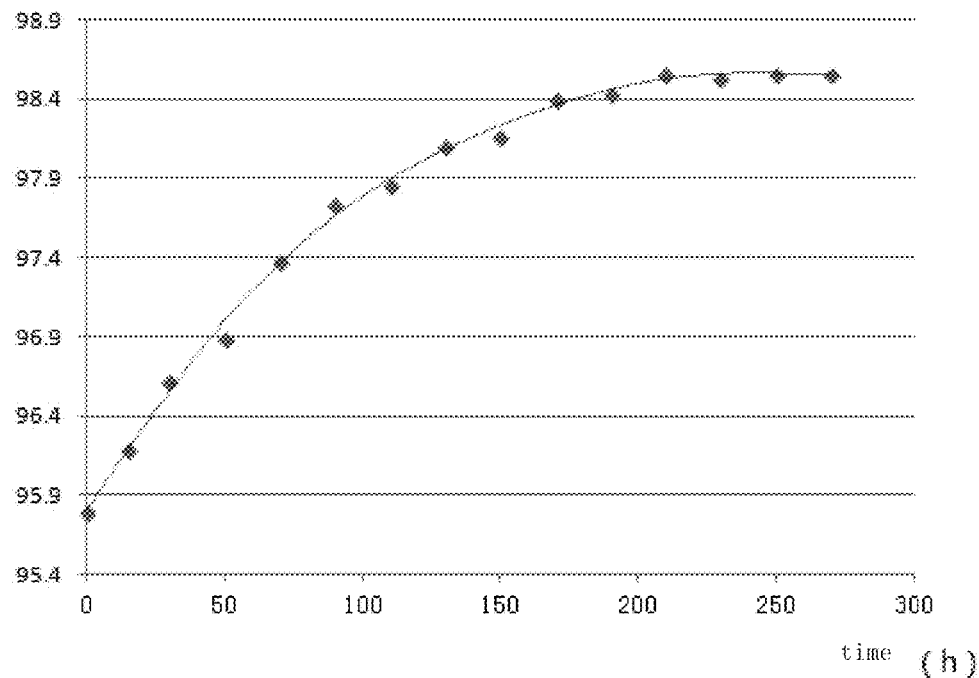
FIG. 2 shows the relationship between refluxing time and abundance of Li-7 in Example 1 of the invention.

The backflow cascade process was taken. At different times during the process, the change in isotope Li-7 abundance of the product (P) was determined, as shown in FIG. 2.

The backflow process steadily ran for 230 hours to achieve balance. The Li-7 molar flow in the product (P) of the product acquiring section was controlled at 0.9% of that in the organic phase at the exit of the enrichment section. It was determined that the abundance of isotope Li-7 in the feed liquid (F) at entrance was 95.81%, while that of the enriched product (P) was 98.55%.

The stage efficiency of the enrichment section was 90%.

Example 2

The lines were connected according to the design diagram of backflow cascade process, wherein the stage number of every section was as follows: 10 stages in the upper backflow section, 14 stages in the extraction section, 26 stages in the enrichment section, 10 stages in the lower backflow section and 5 stages in the product acquiring section.

The organic phase comprised 9-trifluoromethyl-10-hydroxy benzoquinoline (concentration was 0.65 mol/L), synergistic extractant and diluents. The nuclear magnetism of 9-trifluoromethyl-10-hydroxy benzoquinoline: 1H NMR: δ 8.85 (d, J=4.8 Hz, 1H), 8.33 (d, J=8.4 Hz, 1H), 7.85 (d, J=8.7 Hz, 1H), 7.83 (d, J=8.7 Hz, 1H), 7.75 (d, J=9.3 Hz, 1H), 7.64 (dd, J=8.4 Hz, J=4.8 Hz, 1H), 7.43 (d, J=8.4 Hz, 1H). $^{19}$F NMR: $\delta^-$62.1 (s, 3F).

Upper backflow phase-conversion liquid (S1): potassium hydroxide aqueous solution having a concentration of 6 mol/L.

Lower backflow phase-conversion liquid (S2): KCl aqueous solution having a concentration of 0.8 mol/L.

The liquid-liquid separation equipment: high-speed centrifugal extractor.

The aqueous phase and the organic phase were continuously run, and the lithium concentration in the aqueous phase at exit of the upper backflow section was measured to be $3*10^{-4}$ mol/L, while the lithium concentration in the organic phase at exit of the lower backflow section was measured to be $2*10^{-4}$ mol/L.

The backflow process steadily ran for 45 hours to achieve balance. The Li-7 molar flow in the product (P) of the product acquiring section was controlled at 1% of that in the organic phase at the exit of the enrichment section. It was determined that the abundance of isotope Li-7 in the feed liquid (F) at entrance was 92.50%, while that of the enriched product (P) was: 94.21%.

The stage efficiency of the enrichment section was 91%.

It can be seen that by using the backflow cascade process of the present invention, the lithium-7 isotopes was efficient, fast, multi-stage enriched, and a high abundance lithium-7 product was obtained. The process is simple and reasonable, enrichment section is highly efficient. The organic phase has good chemical stability and can be recycled, so it is environmental friendly as well as economical.

All literature mentioned in the present application are incorporated herein by reference, as though each one is individually incorporated by reference. Additionally, it should be understood that after reading the above teachings, those skilled in the art can make various changes and modifications to the present invention. These equivalents also fall within the scope defined by the appended claims.

The invention claimed is:

1. A method for producing lithium-7 isotope which comprises the following steps:
   (1) continuously and countercurrently running an aqueous phase and an organic phase;
   wherein the organic phase sequentially passes through an upper backflow section, an extraction section, an enrichment section, and a lower backflow section circularly,
   and
   wherein the aqueous phase sequentially flows through the lower backflow section, the enrichment section, the extraction section and the upper backflow section, and then flows out;
   (2) adding a lower backflow phase-conversion liquid into the lower backflow section;
   adding an upper backflow phase-conversion liquid into the upper backflow section; and
   adding a reverse extraction liquid into the product acquiring section;

(3) adding a feed liquid comprising lithium-7 into the enrichment section, said feed liquid being extracted by the extraction section and the upper backflow section, and enriched in the enrichment section, wherein the organic phase from the enrichment section is separated into two parts:
(a) one part flowing into the product acquiring section for reverse extraction, thus obtaining an enriched product comprising the lithium-7 isotope; and
(b) the other part flowing into the lower backflow section.

2. The method of claim 1, wherein the method further comprises a step of discharging waste from the extraction section.

3. The method of claim 1, wherein in step (3):
the organic phase extracts the feed liquid comprising lithium-7 in the enrichment section, the extraction section, the upper backflow section; and/or
lower backflow phase-conversion liquid extracts the organic phase in the lower backflow section; and/or
the reverse extraction liquid extracts the organic phase in the product acquiring section so as to obtain the product.

4. The method of claim 1, wherein the method further comprises the following step: after extracting the organic phase in the lower backflow section with lower backflow phase-conversion liquid, the aqueous phase from the lower backflow section backflows into the enrichment section for circular extraction.

5. The method of claim 4, wherein the method comprises the following step: the organic phase from the lower backflow section flows through the product acquiring section into the upper backflow section.

6. The method of claim 1, wherein the organic phase comprises an extractively effective amount of a compound of formula (I):

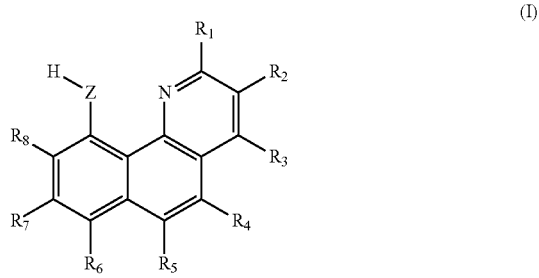

wherein in the formula (I),
Z is oxygen atom, sulfur atom, or nitrogen atom substituted by $R_9$, wherein $R_9$ is hydrogen, $C_{1-6}$ alkyl-sulfonyl, $C_{1-6}$ haloalkyl-sulfonyl, benzenesulfonyl or $C_{1-6}$ alkyl-benzenesulfonyl; $R_1$, $R_2$, $R_3$, $R_4$, $R_5$, $R_6$, $R_7$ and $R_8$ are independently hydrogen, $C_{1-6}$ alkyl, $C_{1-6}$ haloalkyl, $C_{2-6}$ alkenyl, $C_{2-6}$ alkynyl, $C_{1-6}$ alkoxy, $C_{3-6}$ cycloalkyl, halogen or phenyl.

7. The method of claim 1, wherein the method further comprises one or more of the following features:
the upper backflow phase-conversion liquid being an aqueous solution containing a solute selected from the group consisting of: sodium hydroxide, potassium hydroxide, cesium hydroxide, ammonium hydroxide, and combinations thereof;
the lower backflow phase-conversion liquid being an aqueous solution containing a solute selected from the group consisting of: HCl, $H_2SO_4$, HBr, NaCl, $NH_4Cl$, NaBr, $(NH_4)_2SO_4$, $Na_2SO_4$, $NaNO_3$, $NH_4NO_3$, KCl, $K_2SO_4$, and combinations thereof; and
the reverse extraction liquid being an aqueous solution containing a solute selected from the group consisting of: HCl, $H_2SO_4$, HBr, NaCl, $NH_4Cl$, $(NH_4)_2SO_4$, $Na_2SO_4$, and combinations thereof.

8. The method of claim 1, wherein each of the upper backflow section, the extraction section, the enrichment section, the lower backflow section and the product acquiring section comprises a cascade connected liquid-liquid separation equipment.

9. The method of claim 1, wherein the concentration of Li-7 in the aqueous phase at the exit of the upper backflow section and the concentration of Li-7 in the organic phase at the exit of the lower backflow section are less than $10^{-2}$ mol/L; and/or
the ratio between Li-7 molar flow N1 at the exit of the product acquiring section and Li-7 molar flow N2 at the exit of the enrichment section is N1:N2=0.001 to 0.025; and/or
the method further comprises: controlling a fluctuation of a flow rate for the aqueous phase and the organic phase, wherein the fluctuation of flow rate is within 0.5%.

10. The method of claim 6, wherein the organic phase further comprises a synergic extractant.

11. The method of claim 8, wherein the upper backflow section is constituted by X cascade connected centrifugal extractors, wherein $2 \leq X \leq 20$.

12. The method of claim 8, wherein the extraction section is constituted by N cascade connected centrifugal extractors, wherein $10 \leq N \leq 500$.

13. The method of claim 8, wherein the enrichment section is constituted by M cascade connected centrifugal extractors, wherein $10 \geq M \geq 500$.

14. The method of claim 8, wherein the lower backflow section is constituted by Y cascade connected centrifugal extractors, wherein $2 \geq Y \geq 20$.

15. The method of claim 8, wherein the upper product acquiring section is constituted by Z cascade connected centrifugal extractors, wherein $2 \geq Z \geq 20$.

16. The method of claim 8, wherein the liquid-liquid separation equipment is a centrifugal extractor.

17. The method of claim 9, wherein N1:N2=0.001 to 0.02.

18. The method of claim 9, wherein the concentration of Li-7 in the aqueous phase at the exit of the upper backflow section and the concentration of Li-7 in the organic phase at the exit of the lower backflow section are less than $5 \times 10^{-3}$ mol/L.

* * * * *